United States Patent [19]

Kitai et al.

[11] 4,215,923

[45] Aug. 5, 1980

[54] PROGRAMMED SHUTTER

[75] Inventors: Kiyoshi Kitai; Hiroaki Ishida, both of Shikawatashi, Japan

[73] Assignee: Seiko Koki Kabushiki Kaisha, Tokyo, Japan

[21] Appl. No.: 961,743

[22] Filed: Nov. 17, 1978

[30] Foreign Application Priority Data

Nov. 18, 1977 [JP] Japan ................. 52-138738

[51] Int. Cl.² .................................. G03B 7/14
[52] U.S. Cl. ................................... 354/30
[58] Field of Search ............. 354/23, 26, 29–33, 354/57, 230

[56] References Cited

U.S. PATENT DOCUMENTS

| | | | |
|---|---|---|---|
| 3,641,903 | 2/1972 | Fukuda | 354/32 |
| 3,643,562 | 2/1972 | Soichiro et al. | 354/34 |
| 3,677,149 | 7/1972 | Taguchi | 354/23 |
| 4,109,258 | 8/1978 | Arisaka et al. | 354/230 X |

FOREIGN PATENT DOCUMENTS 1213148  11/1970  United Kingdom .................. 354/30

Primary Examiner—Donald A. Griffin
Attorney, Agent, or Firm—Robert E. Burns; Emmanuel J. Lobato; Bruce L. Adams

[57] ABSTRACT

A camera shutter having a sector operating member for use in opening and closing a sector which is also used as an aperture vane and has a normally closed condition, a driving member which is moved by itself after a release operation, a sector opening member movable on said driving member and a control member the position of which may be changed in response to a brightness of the object to be photographed.

In the programmed shutter said control member controls the degree of engagement between said sector opening member and said sector operating member during a displacement of said driving member and the opening of the sector is controlled in response to a brightness of the object to be photographed.

7 Claims, 2 Drawing Figures

PROGRAMMED SHUTTER

BACKGROUND OF THE INVENTION

This invention relates to a programmed shutter and more particulary a device for adjusting a degree of displacement of the sector in the programmed shutter of a type for opening and closing a sector which is also used as an aperture vane.

In a conventional type of said programmed shutter described above, a degree of displacement of the sector is automatically adjusted by an exposure control mechanism, the degree of displacement of the sector is changed every time in response to a brightness of the object to be photographed, and both a diameter of the aperture and a shutter speed are simultaneously set.

In brief, in a conventional prior art which will be described hereinbelow, a cooperative relation between the light receiving device and the exposure meter during a first stroke will define a stopping position of an automatic exposure cooperative member, the sector is slightly opened by a predetermined stopper when the object to be photographed is light to perform a closing operation, and a position of the stopper is changed when the object to be photographed is dark and thereby a large aperture diameter and a long shutter speed may be obtained. A combination between the aperture and the shutter may be continuously selected at an intermediate value.

The prior art programmed shutter described above utilizes in general a system for adjusting a ratio of a lever for transmittance of movement from the driving member for use in opening and closing the sector to the sector operating member by an automatic exposure cooperative mechanism (so called variable magnification lever system). This conventional system has such disadvantages as described below which are not preferable for the system.

That is, it is required that a variable magnification lever having a center of rotation which is moved is arranged between the opening and closing driving member and the sector operating member, or that the center of rotation of the sector operating member is directly changed to use the sector operating member as the variable magnification lever. However, in either case, since a center of rotation of the member which will directly affect a degree of displacement of the sector is changed, it is difficult to eliminate an element which will cause an insufficient performance and an error will be made when the object to be photographed is particulary light and sometimes it is not possible to perform a preferable photographing.

In view of the above described disadvantages, the present invention will provide a programmed shutter for adjusting a degree of opening of the sector by changing only a degree of projection of the sector opening member, and in reference to the provision, the sector opening member is movably arranged on a moving driving member, a degree of projection of the sector opening member during displacement thereof is restricted by a control member which will be displaced in cooperation with automatic exposure sensor mechanism and a degree of displacement of the sector operating member is determined by the degree of projection.

DESCRIPTION OF THE PREFERRED EMBODIMENT

Refering now to the drawings, a preferred embodiment of the present invention illustrated therein will be described hereinafter.

Figure 1:
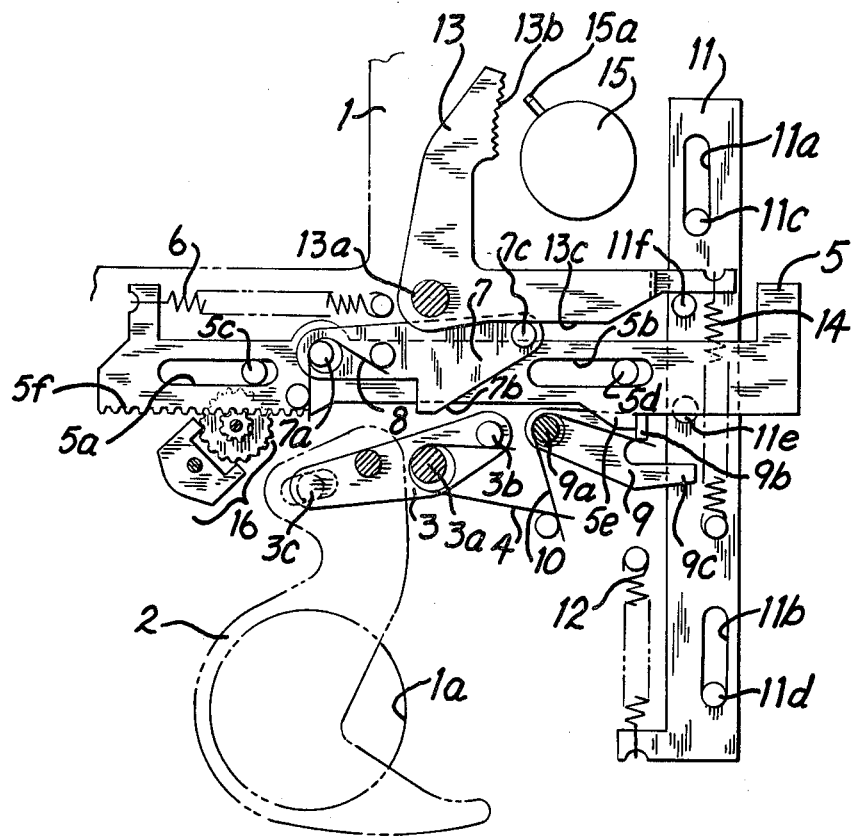
FIG. 1 is a top plan view of a shutter of the present invention showing its closed condition.

In FIG. 1 is illustrated a or cocked charged condition of the shutter in which a reference numeral 1 indicates a shutter base plate and 1a shows an aperture for use in photographing. Reference numbers 2 are sectors which are also used as an aperture vane, and only one of the two sectors is illustrated. Reference numeral 3 shows a sector operating member which is rotated about an axis 3a on the shutter base plate and has a pin 3b and a pin 3c which is inserted into a groove of said sectors 2. The sector operating member is biased in a counter-clockwise direction by a spring 4 to keep the sectors 2 in a closed condition. Reference numeral 5 is a driving member having longitudinal slots 5a and 5b which is guided by the pins 5c and 5d mounted on the shutter base plate and further biased in a rightward direction by a spring 6. The driving member 5 is further provided with a projection 5e. The driving member 5 is formed with a rack 5f which is engaged with a governor device 16.

Reference numeral 7 is a sector opening member which is pivoted around the shaft 7a on said driving member 5 and has a cam face 7b and a pin 7c. The sector opening member is biased in a counter clockwise direction by a spring 8. Reference number 9 indicates an engagement pawl which is rotated about an axis 9a on the shutter base plate 1 and has an arm 9c and a raised portion 9b engaging with the projection 5e of said driving member 5. The engagement pawl is biased in a counter clockwise direction by a spring 10. Reference number 11 indicates a release member having longitudinal slots 11a and 11b which is guided by the pins 11c and 11d mounted on the shutter base plate 1 and kept at the raised position by a spring 12. Further, the release member 11 has a stopper pin 11f and a pin 11e for pushing the arm 9c of said engagement pawl 9.

Reference numeral 13 shows a control member which is rotatably installed on an axis 13a on the shutter base plate 1 and has a stepped cam part 13b and a cam face 13c abutting against the pin 7c of said sector releasing member 7. The control member is connected with said release member 11 via a spring 14 and kept at a stopped position by the pin 11f on the release member 11. Reference number 15 indicates an exposure meter having a stopper 15a which is displaced in response to a brightness of the object to be photographed.

The operation of the previously described arrangement will now be described.

When the release member 11 is pushed down from that condition shown in FIG. 1, an initial operation of the release member 11 will cause the well-known automatic exposure sensing mechanism to be operated and thereby the control member 13 is rotated in a clockwise direction, the cam face 13c of the control member 13 pushes the pin 7c on the sector opening member 7 and the sector opening member 7 is rotated in a clockwise direction and then stopped at a certain position. This position will be determined in reference to an amount of clockwise rotation of said control member 13 permitted by the automatic exposure sensing mechanism. A displacement of the control is small when the object to be photographed is bright and is great when the object is dark.

When the release member 11 is further pushed down, the pin 11e on the release member 11 pushes the arm 9c of the engagement pawl 9 to cause the engagement pawl 9 to be rotated in a clockwise direction, releasing the engagement between the raised part 9b of the engagement lever 9 and the projection 5e of the driving member 5 and then the driving member 5 starts to run in a rightward direction. During this period, the driving member 5 is run slowly by the governor mechanism 16 and along with this movement the sector releasing member 7 on the driving member 5 will be moved. The sector opening member 7 will be moved along the cam face 13c of said control member 13. At this time, the cam face 7b of the sector opening member 7 pushes the pin 3b of the sector operating member 3, and the sector operating member 3 starts to rotate in a clockwise direction against the spring 4 and thereby to open the sector 2. Further when the driving member 5 is moved and the apex point of the cam face 7b of the sector opening member 7 reaches the pin 3b of the sector operating member 3, a clockwise rotation of the sector operating member 3 is terminated and thus an opening operation of the sector 2 is also terminated. Subsequent to the above operation, when the driving member 5 is moved and the cam face 7b of the sector opening member 7 is moved past the pin 3b of the sector operating member 3, the sector operating member 3 will close the sector by a counter-clockwise rotation caused by the spring 4. The driving member 5 is slightly moved after the cam face 7b of said sector opening member 7 is moved past the pin 3b of the sector operating member 3, the terminal ends of the longitudinal slots 5a and 5b of the driving member 5 are abutted against the pins 5c and 5d and then the driving member will be stopped.

Upon completion of photographing, a release of a pressing force on the release member 11 will cause the release member 11 to be raised by the spring 12, the control member 13 is moved in a counter-clockwise direction by the pin 11f on the release member up to its original position and along with this movement the sector opening member 7 will be rotated in a counter-clockwise direction by the spring 8 and returned to its initial position.

Figure 2:
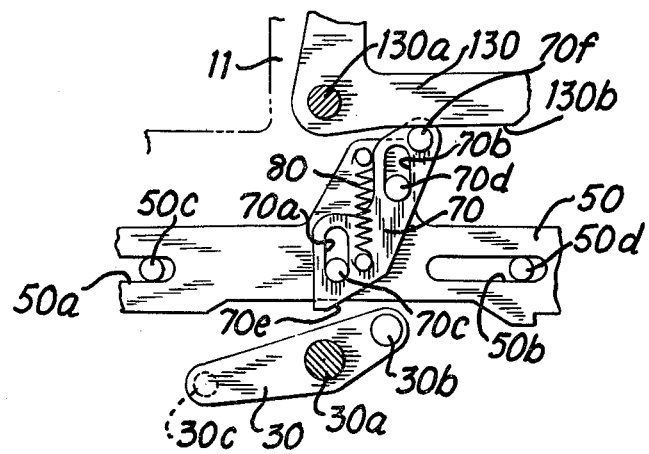
FIG. 2 is a partial top plan view illustrating an embodiment of further form of a sector releasing member.

In FIG. 2 is illustrated a further embodiment of the present invention. Reference numeral 30 indicates a sector operating member which is rotated about an axis 30a on the shutter base plate 11 and has a pin 30b and a pin 30c which is fitted in the slot (not shown) of the sector. Reference numeral 50 is a driving member having a longitudinal slots 50a and 50b which is guided by the pins 50c and 50d on the shutter base plate 11. Reference numeral 70 is a sector opening member having longitudinal slots 70a and 70b which is guided by the pins 70c and 70d on said driving member 50. The sector opening member has a cam face 70e and a pin 70f and is biased upwardly by the spring 80. Reference numeral 130 is a control member which is rotated about the pin 130a on the shutter base plate 11 and has a cam face 130b. Other components shown in FIG. 2 are the same as that illustrated in the embodiment of FIG. 1 and thus they are not illustrated. The present embodiment relates to a system in which the sector opening member 7 illustrated in FIG. 1 is displaced under a linear movement on the driving member 50.

It may be preferable to provide an alternative arrangement of a pin and a longitudinal slot in place of both the sector opening member 7 in FIG. 1 and the control member 13. It is also possible to provide a similar arrangement of the sector opening member 70 and the control member 130 shown in FIG. 2. Therfore, in this case, it is of cource possible to eliminate the springs 8 and 80 acting upon each of the sector opening members 7 and 70.

Since the present invention is constructed as described above, it is not required to provide a variable magnification lever mechanism and an amount of operation of the sector is determined by adjusting only a degree of projection of the sector opening member. Thus, it is not necessary to make a displacement of a center of rotation which will directly affect an operation of the sector and consequently less error is found and it is possible to provide a higher degree of exposure accuracy when the object to be photographed is particulary light.

The sector opening member is already out of the sector operating member when the driving member is moved in such a direction as that of the operation of the shutter in order to provide preparation for the next photographing, and thus the sector will not be operated. Thus, it is not required to provide another mechanism for use in cutting off the light against a film and further the present invention may provide such effects as the arrangement may easily be made.

What is claimed is:

1. A programmed shutter mechanism for a camera, comprising: a control member having a position controlled in response to a brightness of an object to be photographed; a driving member releasable to travel from a cocked position to a rest position; means for releasing said driving member; at least one sector-aperture blade; a sector operating member mounted for pivoting about a fixed axis, said sector operating member having a portion for engaging said sector-aperture blade to operate said sector-aperture blade for controlling exposure; means biasing said sector operating member to pivot about said fixed axis in a direction to close said sector-aperture blade; and sector opening means mounted on said driving member and cooperative with said control member for pivoting said sector operating member in a direction effective to open said sector-aperture blade through a distance determined by said control member as said driving member travels from the cocked position to the rest position.

2. A programmed shutter mechanism as claimed in claim 1, further comprising: a base plate having an aperture for exposing film therethrough in use to photograph; a shaft fixed on said base plate and having said sector operating member mounted thereon for pivoting about said shaft; and said sector-aperture blade positioned covering said aperture when said sector-aperture blade is in the closed condition, and engaged by said portion of said sector operating member to move and uncover said aperture in response to pivoting of said sector operating member about said fixed pivot axis defined by said fixed shaft.

3. A programmed shutter mechanism as claimed in claim 1, wherein said sector opening means is comprised of: a lever; a pin mounting said lever on said driving member for pivoting on said pin and in a position to pivot toward and away from said sector operating member; and said lever having an edge portion defining a cam for pivoting said sector operating member through a distance dependent on how for said lever is pivoted toward said shutter operating member.

4. A programmed shutter mechanism as claimed in claim 3: wherein said control member is a lever mounted for pivoting toward and away from said sector opening means lever, said control member lever having an edge defining a cam for bearing against said sector opening means lever to pivot said sector opening means lever toward said sector operating member by a distance determined by the position of said control member lever; and wherein said sector opening means further comprises biasing means for biasing said sector opening means lever away from said sector operating member and toward said control member lever.

5. A programmed shutter mechanism as claimed in claim 1, wherein said sector opening means is comprised of: a plate-like element having a pair of elongated slots; a pair of pins mounting said plate-like element on said driving member with each of said pins extending into a respective one of said slots for slidably mounting said plate-like element, and said slots oriented to permit said plate-like element to slide toward and away from said sector operating member; and said lever having an edge portion defining a cam for pivoting said sector operating member through a distance dependent on how far said plate-like element is displaced toward said shutter operating member.

6. A programmed shutter mechanism as claimed in claim 5: wherein said control member is a lever mounted for pivoting toward and away from said sector opening means plate-like element, said control member lever having an edge defining a cam for bearing against said sector opening means plate-like element to displace said sector opening means plate-like element toward said sector operating member by a distance determined by the position of said control member lever; and wherein said sector opening means further comprises biasing means for biasing said sector opening means plate-like element away from said sector operating member and toward said control member lever.

7. A programmed shutter mechanism as claimed in claims 1, 2, 3, 4, 5 or 6: wherein said driving member is an elongated plate-like element mounted to travel in its length direction and having a protrusion extending therefrom; the shutter mechanism further comprising means for biasing said driving member to travel along its length dimension from the cocked position to the rest position; and said means for releasing said driving member comprising a pawl for engaging said protrusion of said driving member to hold said driving member in the cocked position and mounted to pivot out of engagement with said protrusion for releasing said driving members from the cocked position; biasing means for biasing said control member to said sector opening means; and a release member positionable for pivoting said pawl out of engagement with said protrusion.

* * * * *